United States Patent
Logan

[11] Patent Number: 6,099,083
[45] Date of Patent: Aug. 8, 2000

[54] RETENTION MECHANISM FOR USE WITH AN AXLE ASSEMBLY

[75] Inventor: Samuel Logan, Oreland, Pa.

[73] Assignee: Graco Children's Products Inc., Elverson, Pa.

[21] Appl. No.: 09/177,896

[22] Filed: Oct. 23, 1998

[51] Int. Cl.[7] .................................................. B60B 23/00
[52] U.S. Cl. .......................... 301/111; 301/121; 301/122
[58] Field of Search ................................. 301/111, 112, 301/119, 121, 122, 118, 120, 113

[56] References Cited

U.S. PATENT DOCUMENTS

| | | | |
|---|---|---|---|
| 745,989 | 12/1903 | Ayres | 301/111 |
| 765,575 | 7/1904 | Gould | 301/111 |
| 2,901,261 | 8/1959 | Olvey | 280/36 |
| 3,740,100 | 6/1973 | Perego | 301/121 |
| 3,967,342 | 7/1976 | Gebhard | 16/48 |
| 4,043,685 | 8/1977 | Hyams | 403/19 |
| 4,544,425 | 10/1985 | Provolo | 301/122 |
| 4,664,252 | 5/1987 | Galbraith | 301/121 |
| 4,812,094 | 3/1989 | Grube | 411/134 |
| 4,978,175 | 12/1990 | Wu | 301/121 |
| 5,144,717 | 9/1992 | Siesholtz et al. | 16/47 |
| 5,188,430 | 2/1993 | Chiu | 301/111 |
| 5,205,578 | 4/1993 | Liu | 280/642 |
| 5,222,786 | 6/1993 | Sovis et al. | 301/111 |
| 5,224,961 | 7/1993 | Liu | 301/111 |
| 5,277,480 | 1/1994 | Chiu | 301/111 |
| 5,408,723 | 4/1995 | Julien et al. | 16/30 |
| 5,573,311 | 11/1996 | Clohessy | 301/105.1 |
| 5,716,107 | 2/1998 | Parker et al. | 301/111 |
| 5,800,023 | 9/1998 | Hartenstine et al. | 301/111 |
| 5,902,018 | 5/1999 | Owen et al. | 301/111 |
| 5,921,635 | 7/1999 | Deliman et al. | 301/111 |

FOREIGN PATENT DOCUMENTS 2911406  10/1980  Germany .

OTHER PUBLICATIONS

Assembly Instructions, Retention mechanism for use with axle assembly; Graco Children's Products Inc., 51 South Pine Street, P.O. Box 100, Elverson, Pennsylvania 19520. Publication date Jul., 1995.

*Primary Examiner*—S. Joseph Morano
*Assistant Examiner*—Long Bao Nguyen
*Attorney, Agent, or Firm*—Foley & Lardner

[57] ABSTRACT

A retention mechanism for an axle assembly includes an axle and a retainer coupled to the axle thereby securing a wheel on the axle. The retention mechanism of the present invention includes a plurality of fins disposed on the retainer and a plurality recesses and extension disposed on the axle. The radial extensions engage the fins such that the retainer is prevented from rotational movement relative to the axle such that frictional wear between the axle and retainer is substantially reduced while also substantially distributing stresses realized within the retainer.

21 Claims, 4 Drawing Sheets

RETENTION MECHANISM FOR USE WITH AN AXLE ASSEMBLY

This invention generally relates to retention mechanisms for use with axle assemblies. Specifically, this invention relates to retention mechanism for use in rotatably coupling wheels on axles of mobile child carriers.

BACKGROUND OF THE INVENTION

It is well known in the art that axle assemblies include elements such as wheels, gears and the like which are rotatably connected to a spindle or axle. Devices of the above mentioned character have been found to be useful on land vehicles in general and specifically on mobile child carriers thereby imparting mobility to such child carriers. As used herein, mobile child carriers include but are not limited to strollers, prams, mobile entertainers, and the like. Typically, mobile child carriers are provided with wheels which include centrally disposed throughbores. Such mobile child carriers often include a frame having at least one axle attached thereto. The axles are sized to be passed through the throughbores such that the wheels are rotatably coupled to the axles. Although such devices operate effectively, such devices have presented several drawbacks as well. Specifically, the wheels may slide axially along the axle until becoming disengaged therefrom.

A variety of devices have been suggested to retain wheels in association with axles while also not unduly inhibiting the rotatability of the wheels. One known device is the wheel axle retention mechanism currently employed on several strollers marketed by Graco Children's Products such as the stroller marketed under the trademark LITERIDER™. As shown in FIG. 9, LiteRider strollers teach an axle 100 which includes an outer end 102 having a beveled edge 104 and an annular groove 106 formed in the axle 100 and spaced a distance from the outer end 102. In addition, LITERIDER™ strollers include a retainer 108 to rotatably couple a wheel, not shown, on the axle 100. The retainer 108 includes an annular ring portion 110. Extending from the annular ring portion 110 is a skirt portion 112. Specifically, the skirt portion 112 is discontinuous and includes a plurality of legs 114. Further, the retainer 108 includes an engagement portion 116 which has a finger 118 attached to each leg of the plurality of legs 114. Each finger 118 extends inwardly within groove 106 such that forces directed upon the retainer 108 by the wheel along the axial direction of the axle 100 are thereby resisted.

Although devices of the above mentioned character operate effectively to retain a wheel in rotatable association with an axle, such devices could also be substantially improved upon. For instance, it has been found that such retainers often rotate along with the wheel as it rotates about the shaft due to frictional forces exerted upon the retainer by the wheel. As the retainer rotates, friction is in turn created between the axle and the retainer. Commonly, the groove of such axles are formed from a metal material while the retainer is commonly formed from a plastic material. It has been found that such an arrangement often leads to premature part failure since the axle carves into or wears against the retainer. Specifically, it has been found that the groove of such axles often includes sharp edges which carve into and wears against the portion of the retainer adjacent the groove.

Various other devices have been suggested to interconnect a wheel to an axle while minimizing part degradation. One such device is disclosed in U.S. Pat. No. 5,188,430 to Chiu. Chiu suggests a structure for golf car wheels including a wheel having a pair of hole bushings mounted within the wheel. The hole bushings are in turn pivotably coupled to a shaft bushing fitted through the wheel and contacting the wheel bushings. The structure to Chiu also includes a shaft having two recesses 42 which are received within the wheel bushing. Such devices operate by allowing the wheel bushing to rotate relative to the hole bushings. To minimize part wear between the shaft and the wheel bushing, the shaft is fixed relative to the wheel bushing by two elastic clamping fingers disposed on the wheel bushing which engage the two recesses on the axle. Accordingly, the axle is fixed relative to the wheel bushing such that the frictional forces which occur due to the rotation of the wheel are concentrated between the wheel bushing and the hole bushings.

Although the above mentioned device provides advantages, such devices also have several drawbacks as well. Specifically, such devices do not operate to reduce friction between a retainer and an axle. Instead, such devices merely operate to fix an axle relative to a bushing. Further, the two clamping fingers are attached to two pressing ends; however, the axle and wheel bushings are engaged at only two locations. Although such devices reduce frictional wear, the stresses realized by fixing the wheel bushing relative to the axle is concentrated at the two locations where the clamping fingers engage the recesses of the axle. Accordingly, the stresses realized between the wheel bushing and the axle may result part failure due to the discontinuous stress concentrations.

As can be best appreciated by one skilled in the art, several advancements in the art would be desirable. Specifically, it would be desirable to have a retention mechanism that may secure a wheel to an axle thereby preventing the wheel from becoming undesirably disengaged from the axle. It would also be desirable to have a device which is designed to prevent friction induced rotation between the wheel and the axle thereby minimizing wear and premature part failure of the retention mechanism. In addition, it would also be desirable to have a retention mechanism that distributes the stresses realized within the retention mechanism caused by rotation of the wheel once again minimizing part failure.

SUMMARY OF THE INVENTION

It is an object of this invention to provide a retention mechanism which operates effectively to retain a wheel on an axle.

It is another object of this invention to a provide retention mechanism which reduces friction induced rotation between the axle and the retention mechanism.

It is further an object of this invention to provide a retention mechanism which distributes stresses realized in the retention mechanism due to the rotation of the wheel.

According to the present invention, a retention mechanism for an axle assembly is provided. The retention mechanism includes an axle. The axle has a plurality of recesses formed with the axle. One unique aspect of the present invention is that the axle also includes a plurality of radial extensions separate the recesses. Each of the radial extensions have a width.

The retention mechanism also includes a retainer which is coupled to the axle by an engagement portion. The engagement portion includes a plurality of fins. Each of the fins are spaced a distance apart around the axle. The width of each of the radial extensions is approximately less than the distance the fins are spaced apart such that the radial extensions may engage the fins.

As can be best appreciated by one skilled in the art, the present invention provides several advantages. Specifically, the present invention provides a retention mechanism which may be utilized to prevent an object such as a wheel disposed on the axle from undesirably sliding axially relative to the axle. Another advantage of the present invention is that the plurality of radial extensions engage the fins such that the retention mechanism is prevented from rotating relative to the axle. As such wear between the axle and retention mechanism is substantially reduced. Yet another advantage of the present invention is that the retention mechanism is uniquely configured to reduce the opportunity of material degradation of the retention mechanism. Specifically, the retention mechanism of the present invention distributes stresses within the retention mechanism since each fin is spaced a distance apart. As such, each fin bears a portion of the stresses realized due to rotation of an object such as a wheel about the axle.

To assemble the present invention, an employee is presented with a substantially simplified assembly process. First, the employee will secure an object such as a wheel to the axle such that a portion of the axle extends from the wheel. Next, the employee will then couple the retainer to the axle. Specifically, the employee will press the retainer onto the axle until the plurality of radial extensions are disposed within the groove of the wheel. Lastly, the employee will inspect the retention mechanism to ensure that each fin is disposed between corresponding radial extensions of the axle.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
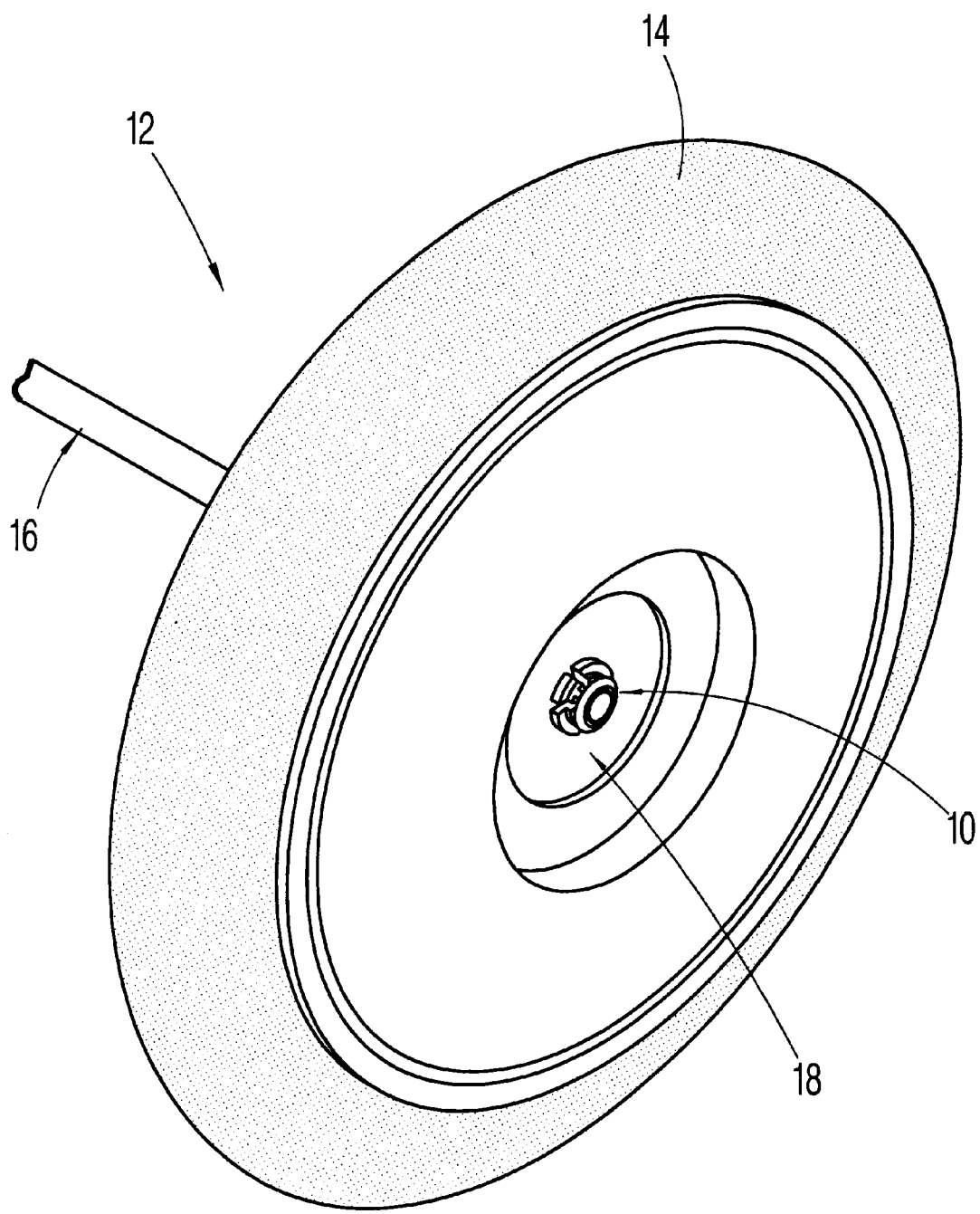
FIG. 1 shows a fragmentary prospective view of the present invention with a wheel coupled to an axle by a retention mechanism.
Figure 2:
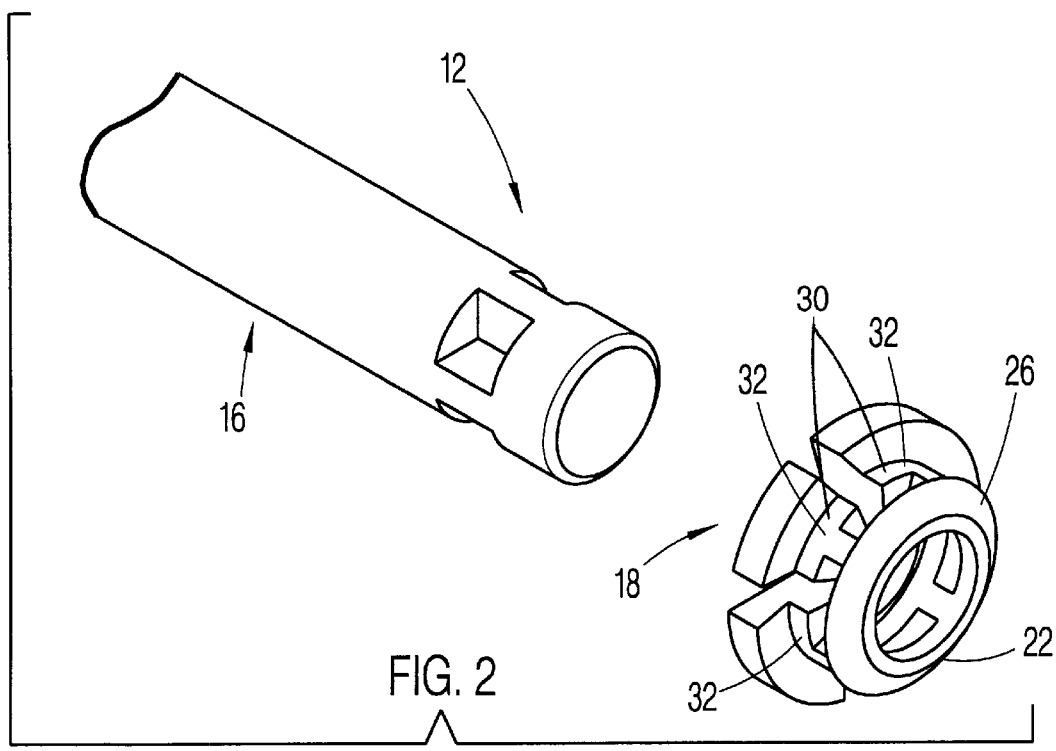
FIG. 2 shows an exploded view of the axle and a retainer of the present invention.

As best appreciated with reference to FIG. 1, the present invention provides a retention mechanism 10 for an axle assembly 12. The retention mechanism 10 may be utilized for a variety of purposes. Preferably, the retention mechanism 10 may be utilized to secure a wheel 14 to an axle 16. As seen in FIG. 2, the retention mechanism 10 includes a retainer 18 which is coupled to the axle 16.

Figure 3:
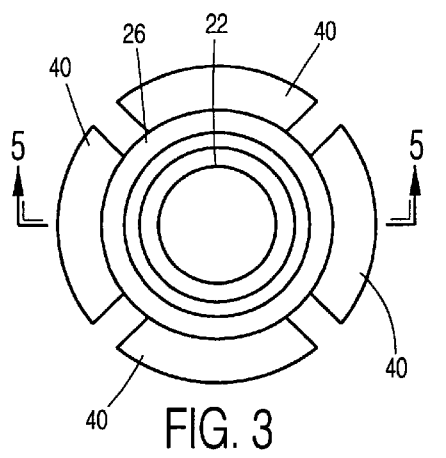
FIG. 3 shows a top plan view of the retainer of the present invention.
Figure 4:
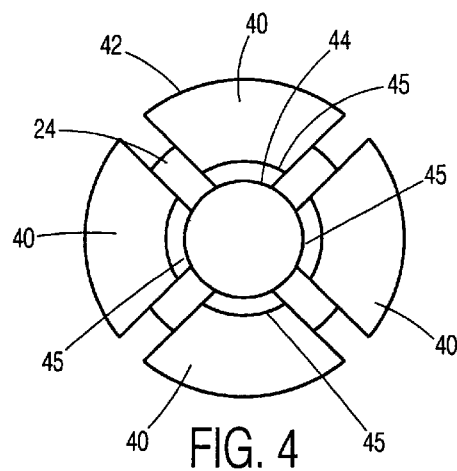
FIG. 4 shows a bottom plan view of the retainer of the present invention.
Figure 5:
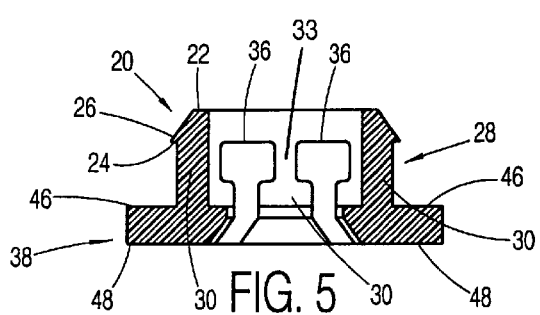
FIG. 5 shows a cross-section of the retainer along line 5—5 of FIG. 3.
Figure 6:
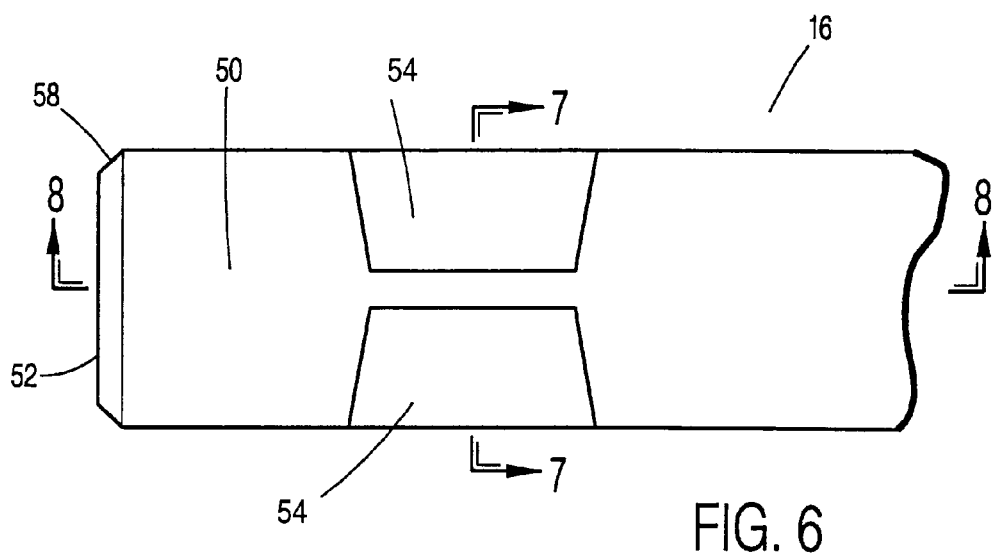
FIG. 6 shows a fragmentary plan view of the axle.
Figure 7:
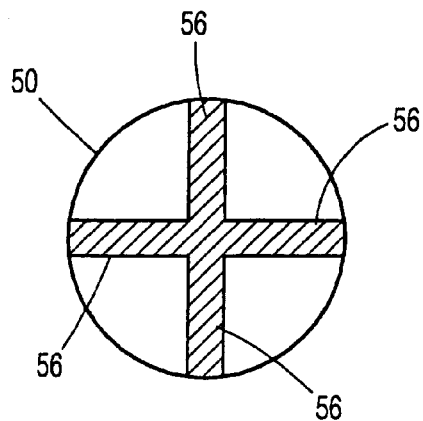
FIG. 7 shows a cross-section of the axle along line 7—7 of FIG. 6.
Figure 8:
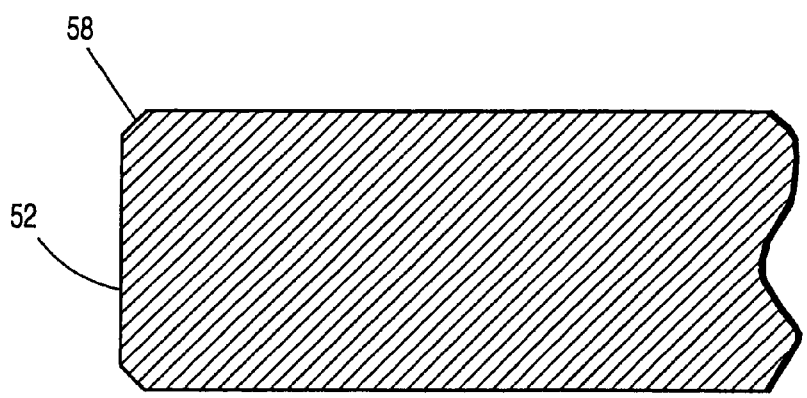
FIG. 8, shows a cross-section of the axle along line 8—8 of FIG. 6.
Figure 9:
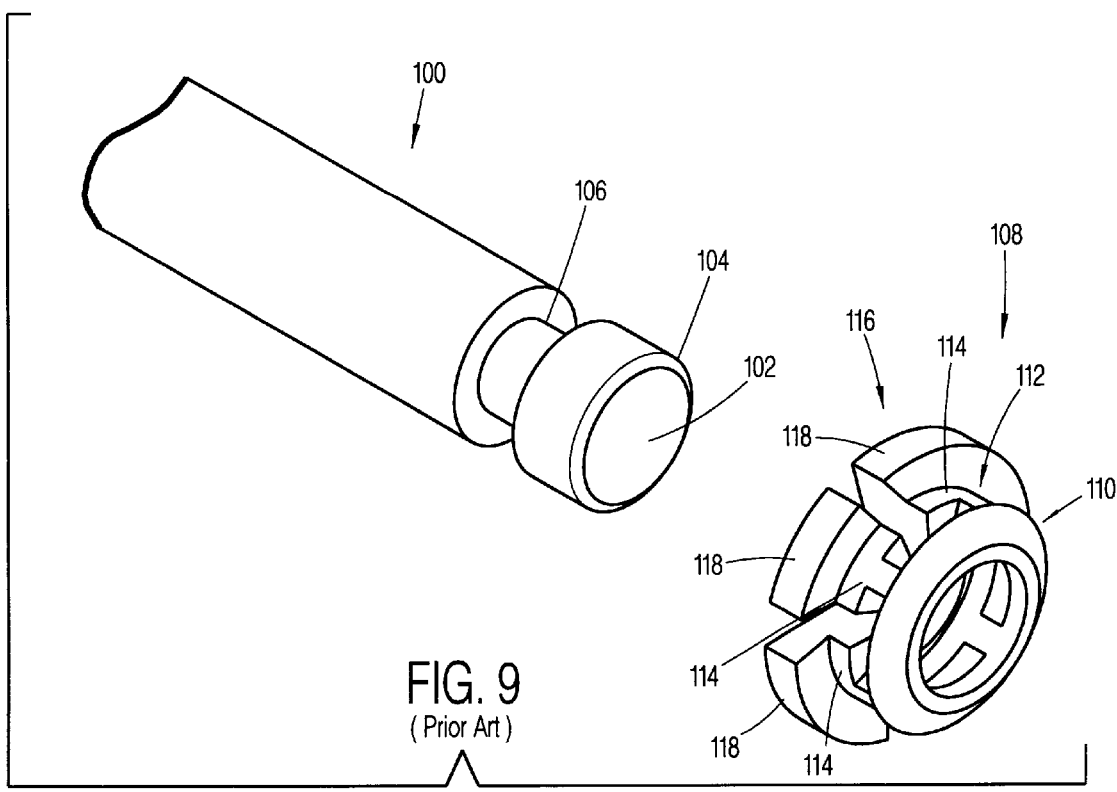
FIG. 9, shows an exploded view of a prior art axle and retainer.

As best appreciated with reference to FIG. 3, FIG. 4 and FIG. 5, the retainer 18 includes a hoop portion 20. The hoop portion 20 has an upper surface 22, a lower surface 24 oppositely disposed relative to the upper surface 22 and an outer surface 26 interconnected between the upper surface 22 and the lower surface 24. Most preferably, the outer surface 26 is beveled relative to the upper surface 22 and the lower surface 24.

The retainer 18 also preferably includes an intermittent skirt portion 28 extending from the hoop portion 20. Preferably, the intermittent skirt portion 28 extends from the lower surface 24 of the hoop portion 20. The intermittent skirt portion 28 comprises a plurality of legs 30. Most preferably, as best appreciated with reference to FIG. 2, the plurality of legs 30 have a radiused outer surface 32 and a radiused inner surface 33, inwardly disposed relative to the radiused outer surface 32. As best appreciated with reference to FIG. 5, each leg of the plurality of legs 30 is approximately an inverted T-shape in appearance having a slot 36 between each adjacent leg of the plurality of legs 30. Accordingly, each slot 36 is approximately T-shaped. In a highly preferred embodiment, the plurality of legs 30 are four legs. Each leg of the plurality of legs 30 being equally spaced a distance apart around the hoop portion 20.

Further, the retainer 18 includes an engagement portion 38 extending from the intermittent skirt 28. The engagement portion 38 includes a plurality of fins 40. Most preferably, each fin of the plurality of fins 40 extends from one of the legs of the plurality of legs 30, spaced a distance apart relative to one another. In a highly preferred embodiment, the plurality of legs 30 is four legs. Each fin of the plurality of fins 30 has a radiused outer surface 42 and a radiused inner surface 44 oppositely disposed relative to the radiused outer surface 42. Most preferably, each fin of the plurality of fins 40 includes a beveled portion 45 disposed adjacent the radiused inner surface 44. Further each fin 40 also has a planar upper surface 46 and an oppositely disposed planar lower surface 48.

The retention mechanism 10 of this invention also includes an axle 16. The axle 16 includes an outer cylindrical surface 50 having a first diameter and an end surface 52. Preferably, the end surface 52 has a beveled portion 58 interconnecting the outer cylindrical surface 50 and the end surface 52. Spaced inwardly relative to the end surface 52 is a plurality of recesses 54 circumferentially disposed around the axle 16 and extending into of the outer cylindrical surface 50. One unique aspect of the present invention is that the axle 16 also includes a plurality of radial extensions 56 extending radially relative to the axle 16. Each radial extension of the plurality of radial extensions 56 having a width and is spaced around the and separating the recesses 54 relative to one another. Preferably, the width of each radial extension of the plurality of radial extensions 56 is approximately less than the distance each fin of the plurality of fins 40 are spaced apart. Most preferably, the width of each radial extension and the space between each fin is approximately equal such that the retainer is frictionally coupled to the axle 16. The hoop portion 20 and the intermittent skirt portion 28 is sized to be receivable about the outer cylindrical surface 50 of the axle 16.

In a highly preferred embodiment, the retainer 18 is formed from an elastically deformable material. Most preferably, the retainer 18 is formed from a plastic material or other similar materials capable of exhibiting a substantial amount of elastic deformation. Further, the axle 16 is formed from a resilient material. Most preferably the axle is formed from steel or other similar materials exhibiting a substantial amount of resiliency.

One skilled in the art can best appreciate that the above disclosed invention provides several advantages. One such advantage is that the retention mechanism 10 operates to secure an object such as the wheel 14 to the axle 16 thereby preventing the wheel 14 from undesirably becoming separated therefrom. Another advantage of the present invention is that it substantially reduces the opportunity for the axle 16 to carve into or otherwise wear into the retainer 18. Specifically, the retainer 18 is fixedly coupled to the axle 16 thereby preventing the retainer 18 from rotating relative to the axle 16. Accordingly, the retainer 18 is not frictionally rotated by the wheel 14 due to frictional forces exerted upon the retainer 18 by the wheel 14. Accordingly, the wheel 14 is permitted to rotate relative to the retainer 18 and the axle 16 while simultaneously preventing rotation of the retainer 18.

Yet another advantage of the present invention is that not only is frictional wear between the axle 16 and the retainer 18 substantially reduced, but the present invention also distributes the stresses realized by the retainer 18 from the wheel 14 substantially equally throughout the retainer 18. This advantage is achieved by the unique placement of the plurality of fins 40 of the retainer 18 and the radial extensions 56 of the axle 16 substantially equally about the respective retainer 18 and axle 16. Accordingly, the stresses realized within the retainer 18 will be substantially dispersed throughout the retainer 18.

During assembly, an employee is presented with a substantially simplified assembly process. Specifically, the employee will mount the wheel 14 to the axle 16 such that the axle 16 extends outward from the wheel 14. Next, the employee will place the retainer 18 in contact with the end surface 52 of the axle 16. As the employee presses downward on the retainer 18, the beveled portion 58 of the axle 16 and the beveled portion 45 of each fin of the plurality of fins 40 interact to camingly deform the retainer 18 to flex outward such that end surface 52 of the axle 16 may be fitted within the retainer 18. As the employee further urges the retainer 18 onto the axle 16, the retainer 18 will elasticity spring back to its pre-deformed state. As such, each fin of the plurality of fins 40 are thereby disposed within the groove 54 of the axle 16. Lastly, the employee will inspect the retention mechanism 10 to ensure that each fin of the plurality of fins 40 is properly disposed between an adjacent par of radial extensions of the plurality of radial extensions 56. The retainer 18 is thereby fixedly coupled to the axle 16.

In use, the above disclosed invention may be utilized on a variety of land vehicles such as mobile child carriers. As best appreciated by one skilled in the art, the present invention provides a retention mechanism 10 that operates to allow the wheel 14 to rotate about the axle 16 while preventing the wheel 14 from undesirably becoming disassociated from the wheel 14 or causing pre-mature part failure.

While our invention has been described in terms of preferred embodiments, it is apparent that other forms could be adopted by one skilled in the art, such as by incorporating the novel features of this invention within axle assemblies which structurally differ from that shown in the Figures. Accordingly, the scope of our invention is to be defined by the following claims.

What is claimed is:

1. A retention mechanism for an axle assembly comprising:

an axle having a plurality of recesses and a corresponding number of radial extensions separating said recesses, each of said radial extensions having a width; and a retainer for preventing a wheel mounted on the axle from falling off said axle, said retainer having an engagement portion having a plurality of spaced fins each dimensioned to be seated in one of said recesses, said width of each of said radial extensions being approximately less than the distance separating said fins to allow each of said fins to be received and confined between an adjacent pair of said radial extensions to prevent said retainer from rotating relative to said axle.

2. A retention mechanism for an axle assembly as recited in claim 1, wherein said fins are equally spaced around said axle, forming said recesses that are equally spaced.

3. A retention mechanism for an axle assembly as recited in claim 1, wherein said fins are four in number and said slots are four in number.

4. A retention mechanism for an axle assembly as recited in claim 1, wherein each of said fins comprises:

a lower surface;

an oppositely disposed upper surface;

an outer radiused surface;

an inner radiused surface inwardly disposed relative to said outer surface; and a beveled portion proximate said inner radiused surface.

5. A retention mechanism for an axle assembly as recited in claim 1, wherein said retainer is formed from an elasticly deformable material.

6. A retention mechanism for an axle assembly as recited in claim 5, wherein said retainer is formed from a resilient material.

7. A retention mechanism for an axle assembly as recited in claim 6, wherein said retainer is formed from plastic.

8. A retention mechanism for an axle assembly as recited in claim 7, wherein said axle is formed from stainless steel.

9. A retention mechanism for an axle assembly as recited in claim 1, wherein said retainer further comprises:

an intermittent skirt portion extending from said engagement portion, said intermittent skirt portion including a plurality of legs, said intermittent skirt portion being sized to be receivable on said axle.

10. A retention mechanism for an axle assembly as recited in claim 9, wherein said retainer further comprises:

a hoop portion extending from said intermittent skirt portion, said hoop portion having an upper surface, said hoop portion further including a lower surface oppositely disposed relative to the upper surface, said hoop portion further including an outer surface interconnecting said upper surface and said lower surface, said hoop portion being sized to be receivable on said axle.

11. A retention mechanism for an axle assembly as recited in claim 10, wherein each of said legs has a generally inverted T-shape.

12. A retention mechanism for an axle assembly as recited in claim 11, wherein the number of said legs is four.

13. A retention mechanism for an axle assembly as recited in claim 12, wherein said outer surface of said hoop portion is beveled.

14. A retention mechanism for an axle assembly comprising:

an axle having an outer cylindrical surface, said axle terminating at an end surface, said axle having a plurality of recesses inwardly spaced relative to said end surface of said axle, said axle further including a plurality of radial extensions separating the recesses; and a retainer for preventing a wheel mounted on the axle from falling off said axle, said retainer including an axle engagement mechanism portion, said axle engagement portion including a plurality of fins adapted to be seated and confined in the recesses, each of said fins being sized to be receivable between a pair of adjacent radial extensions to prevent rotational movement of said retainer relative to said axle.

15. A retention mechanism for an axle assembly as recited in claim 14, wherein each of said fins comprises:

a lower surface;

an oppositely disposed upper surface;

an outer radiused surface;

an inner radiused surface inwardly disposed relative to said outer surface; and a beveled portion disposed adjacent said inner radiused surface.

16. A retention mechanism for an axle assembly as recited in claim 15, wherein said radial extensions each have a same width.

17. A retention mechanism for an axle assembly as recited in claim 16, wherein said fins are spaced apart greater than said width of said radial extensions.

18. A retention mechanism for an axle assembly as recited in claim 16, wherein said fins are spaced apart approximately equal to said width of said radial extensions.

19. A retention mechanism for an axle assembly as recited in claim 18, wherein said retainer is formed from an elasticity deformable material.

20. A retention mechanism for an axle assembly as recited in claim 19, wherein said axle is formed of a metal.

21. A retention mechanism for an axle assembly comprising:

an axle having a plurality of recesses and a corresponding number of radial extensions separating the recesses; and a retainer for preventing a wheel mounted to the axle from falling off the axle, the retainer having a plurality of spaced fins corresponding in number to the number of the recesses, each of the fins being dimensioned to be seated in one of the recesses and confined between an adjacent pair of the radial extensions to prevent the retainer from rotating relative to said axle.

* * * * *